(12) United States Patent
Djabarov et al.

(10) Patent No.: US 9,292,189 B2
(45) Date of Patent: Mar. 22, 2016

(54) TECHNIQUES TO DISPLAY LOCATION-BASED INFORMATION

(71) Applicant: Facebook, Inc., Menlo Park, CA (US)

(72) Inventors: Gueorgui Djabarov, Sunnyvale, CA (US); Daniel Jeng-Ping Hui, Palo Alto, CA (US); Joshua Williams, Menlo Park, CA (US)

(73) Assignee: FACEBOOK, INC., Menlo Park ( * ) Notice: Subject to any disclaimer, the term of this patent is extended or adjusted under 35 U.S.C. 154(b) by 248 days.

(21) Appl. No.: 14/023,652

(22) Filed: Sep. 11, 2013

(65) Prior Publication Data

US 2015/0074596 A1    Mar. 12, 2015

(51) Int. Cl.
    *G06F 3/048*     (2013.01)
    *G06F 3/0485*    (2013.01)
    *G06F 3/0481*    (2013.01)
    *G06F 17/30*     (2006.01)

(52) U.S. Cl.
    CPC ............ *G06F 3/0485* (2013.01); *G06F 3/0481* (2013.01); *G06F 17/3087* (2013.01)

(58) Field of Classification Search
    CPC ............................. G06F 3/0481; G01C 21/00
    USPC ............................................ 715/781, 788, 800
    See application file for complete search history.

(56) References Cited

U.S. PATENT DOCUMENTS

| | | | |
|---|---|---|---|
| 7,705,833 B2* | 4/2010 | Kim ............................. | 345/173 |
| 8,166,410 B2* | 4/2012 | Tadman et al. ............... | 715/764 |
| 8,706,415 B2* | 4/2014 | Su et al. ........................ | 701/533 |
| 9,021,384 B1* | 4/2015 | Beard et al. ................... | 715/781 |
| 2007/0209019 A1* | 9/2007 | Kaval et al. ................... | 715/788 |
| 2009/0063972 A1* | 3/2009 | Ma et al. ....................... | 715/716 |
| 2009/0177381 A1* | 7/2009 | Taniguchi et al. ............ | 701/208 |
| 2010/0191798 A1* | 7/2010 | Seefeld et al. ................ | 709/203 |
| 2011/0181527 A1* | 7/2011 | Capela et al. ................. | 345/173 |
| 2012/0066641 A1* | 3/2012 | Doherty ............... | G06F 9/4443 715/800 |
| 2014/0372217 A1* | 12/2014 | Seacat DeLuca et al. . | 705/14.54 |

\* cited by examiner

*Primary Examiner* — Matthew Ell
(74) *Attorney, Agent, or Firm* — Kacvinsky Daisak Bluni, PLLC

(57) ABSTRACT

Techniques to display location-based information are described. An apparatus may comprise a screen management component and an interface component. The screen management component may be operative to display in a first screen area location-based information on a map according to geographic location, to display in a second screen area a list comprising the location-based information, and to adjust a relative size of the first screen area and the second screen area in response to a received interaction with one of the first screen area and second screen area. The interface component may be operative to receive the interaction with one of the first screen area and second screen area. Other embodiments are described and claimed.

17 Claims, 12 Drawing Sheets

*1000*

Display in a first screen area location-based information on a map according to geographic location.
*1002*

Display in a second screen area a list comprising the location-based information.
*1004*

Receive an interaction with one of the first screen area and second screen area.
*1006*

Adjust a relative size of the first screen area and the second screen area in response to the received interaction.
*1008*

FIG. 10

TECHNIQUES TO DISPLAY LOCATION-BASED INFORMATION

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to display location-based information. Some embodiments are particularly directed to techniques to display location-based information using a split-screen view with a split line that automatically adjust according to user interaction. In one embodiment, for example, an apparatus may comprise a screen management component and an interface component. The screen management component may be operative to display in a first screen area location-based information on a map according to geographic location, to display in a second screen area a list comprising the location-based information, and to adjust a relative size of the first screen area and the second screen area in response to a received interaction with one of the first screen area and second screen area. The interface component may be operative to receive the interaction with one of the first screen area and second screen area. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 10 illustrates an embodiment of a logic flow for the system of FIG. 1.

DETAILED DESCRIPTION

Figure 1:
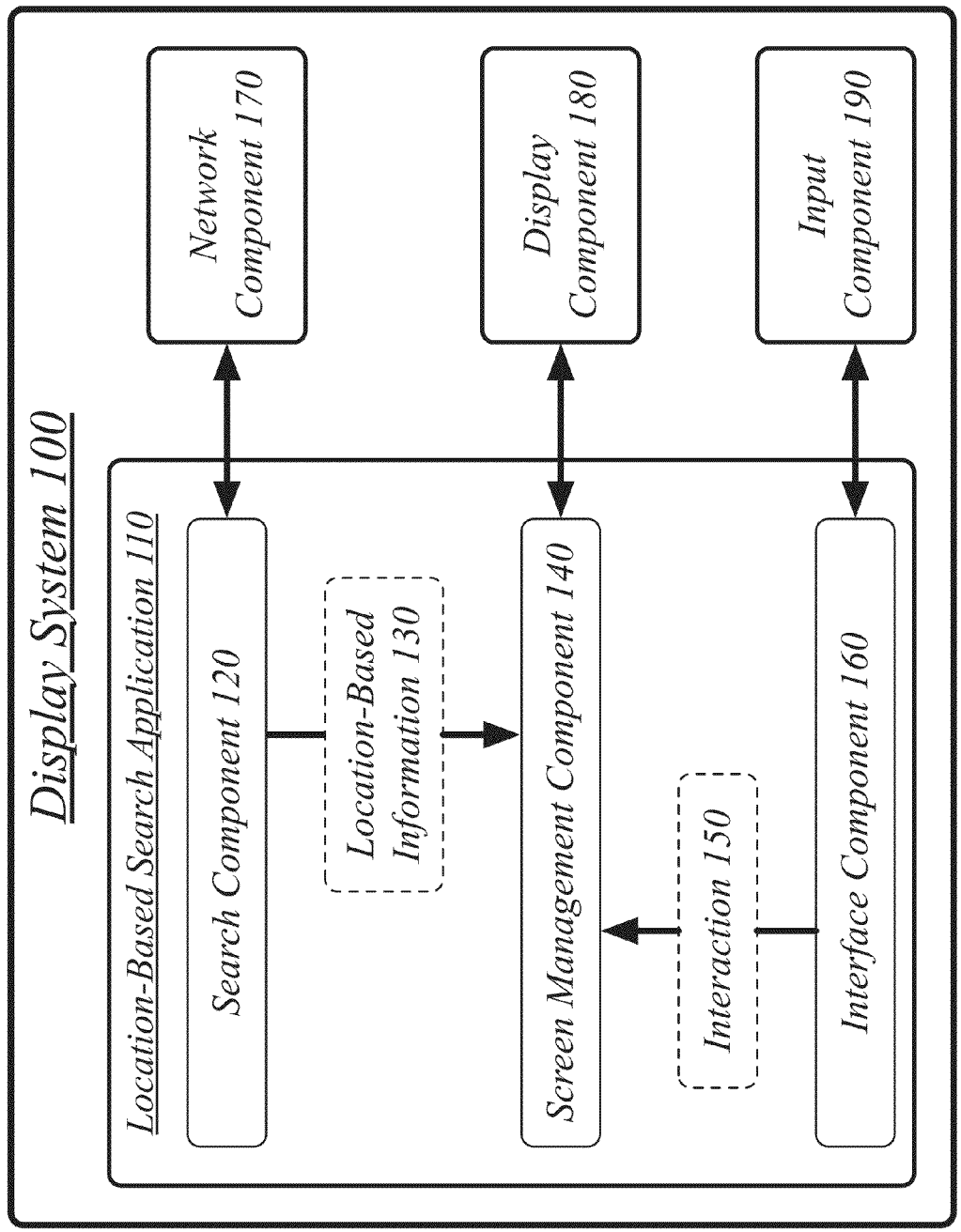
FIG. 1 illustrates an embodiment of a system to display location-based information.

Various embodiments are directed to techniques to display location-based information. Computers are useful for the retrieval of information. Location-based information—information specifically tied to a location, communicating data about a location, or otherwise associated with a location—is a popular type of information retrieved by users. Computer users may search for the selection of restaurants within walking distance, for hotels in a city they are planning to visit, for piano teachers in their neighborhood, for their local polling location, for the nearest mailbox, and for a great variety of other useful information in some way tied to a location.

Location-based information may be of particular utility to users of mobile devices. Mobile devices are available to a user when they are away from traditional desktop computers and other devices lacking portable network access. Because of their small size they are typically carried with their owner for use in various environments. Because they follow users through their changing location mobile devices are useful for location-based searches: a user may receive more utility out of receiving assistance in finding a local restaurant, library, mailbox, pharmacy, and the like when in an unfamiliar location. In some cases, the location-based information may be drawn from a social-networking service. A social-networking service may contain user reviews, location pages, business pages, and other information relevant to various searches. The location-based information may, therefore, be based on information stored by the social-networking service. For example, a user may search for a restaurant using a social-networking service and receive back location-based results that are ranked in priority or selected according to reviews by users of the social-networking service, such as friends of the searching user on the social-networking service. Similarly, the location-based information may include reviews, suggestions, or estimated rankings based on information on the social-networking service or based on the opinions of friends of the user on the social-networking service.

However, many mobile devices—such as hand-held computers, smartphones, PDAs, etc.—have limited screen real estate. Further, many mobile devices use an entirely touch-based interface, a primarily touch-based interface, or an interface significantly using touch commands. User interfaces, including techniques for displaying location-based information, may benefit from being designed specifically for this limited screen real estate and distinctive method of interacting with a mobile device. As such, users may be benefited by displaying the results of a location-based search using a screen split between a map and a list, where interaction with either portion of the split screen results in an automatic increase in the portion of the screen devoted to that type of display. The user is presented with information in a pair of formats with the amount of information presented using a particular format automatically increasing in response to how the user interacts with the information, rather than requiring the user to manually specify that they desire to primarily see one type of display or the other. As a result, the embodiments can improve the user experience of retrieving location-based information on a mobile device.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a display system 100. In one embodiment, the device 100 may comprise a computer-implemented display system 100 having a location-based search application 110 comprising one or more components such as a search component 120, screen management component 140, and interface component 160. Although the display system 100 shown in FIG. 1 has a limited number of elements in a certain topology, it may be appreciated that the display system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The display system 100 may comprise a network component 170, a display component 180, and an input component 190. The network component 170 may be operative to perform network tasks on behalf of an application such as location-based search application 110. For example, the network component 170 may be operative to act as an intermediary between the location-based search application 110 and the Internet, such as may be accessed through a cellular network or other wireless network. The network component 170 may be operative to connect the location-based search application 110 to an Internet-based location-based search system for the retrieval of location-based information 130. The display component 180 may be operative to display information for a user of display system 100 and location-based search application 110. For instance, the display component 180 may display location-based information 130 as part of a user interface. The input component 190 may be operative to receive input from a user and to forward that input to the location-based search application 110. In some embodiments the input component 190 may receive touch commands on the same display managed by display component 180 for the display of information to the user. This may comprise one or more interactions with the touch-screen display wherein the one or more interactions are with positions on the display corresponding to areas or positions of information displayed on the screen.

The display system 100 may comprise a location-based search application 110. The location-based search application 110 may be generally arranged to perform a location-based search on behalf of a user using network component 170, to receive location-based information 130 from the network component 170 in response to the location-based search, to display the location-based information 130 using the display component 180, to receive an interaction 150 with the displayed location-based information 130 from the input component 190, and to modify the display of location-based information 130 based on the interaction 150. The location-based search application 110 may comprise a search component 120, a screen management component 140, and an interface component 160.

The search component 120 may be operative to transmit a location-based search request to a location-based search engine and to receive in response location-based information 130. The location-based search request may have been generated based on a request from a user, such as a request received via the input component 190. The location-based search request may have been received as an explicit location-based search request, where the user manually select a locale, area, or place to use as the center-point or area for a location-based search. The location-based search request may have been received as an implicit location-based search request, such as where a search is assumed to be based on the current location of the mobile device being used by the user to perform the search.

The screen management component 140 may be operative to display in a first screen area location-based information on a map according to geographic location. The screen management component 140 may be operative to display in a second screen area a list comprising the location-based information 130. The screen management component 130 may be operative to adjust a relative size of the first screen area and the second screen area in response to a received interaction 150 with one of the first screen area and second screen area.

The interface component 160 may be operative to receive the interaction 150 with one of the first screen area and second screen area. The interaction 150 may be received from the input component 190 in response to the input component 190 determining a user interaction with a touch-capable display device. A user, having been shown a user interface including the first screen area and second screen area, may interact with a portion of the user interface included in one of those two screen areas.

For instance, with the first screen area displaying location-based information 130 on a map, the interaction 150 being with the first screen area may comprise the user interacting with some portion of the map. The user interacting with the map may comprise selecting an icon representing some portion of location-based information 130, adjusting the geographic area centered in the map, adjusting the zoom level of the map, or any other interaction with the map in the first screen area.

With the second screen area display location-based information 130 in a list, the interaction 150 being with the second screen area may comprise the user interacting with some portion of the list. The user interacting with the lost may comprising selecting a particular entry on the list, scrolling the list, tapping an icon displayed in association with an entry on the list, or any other interaction with the list in the second screen area.

Figure 2:
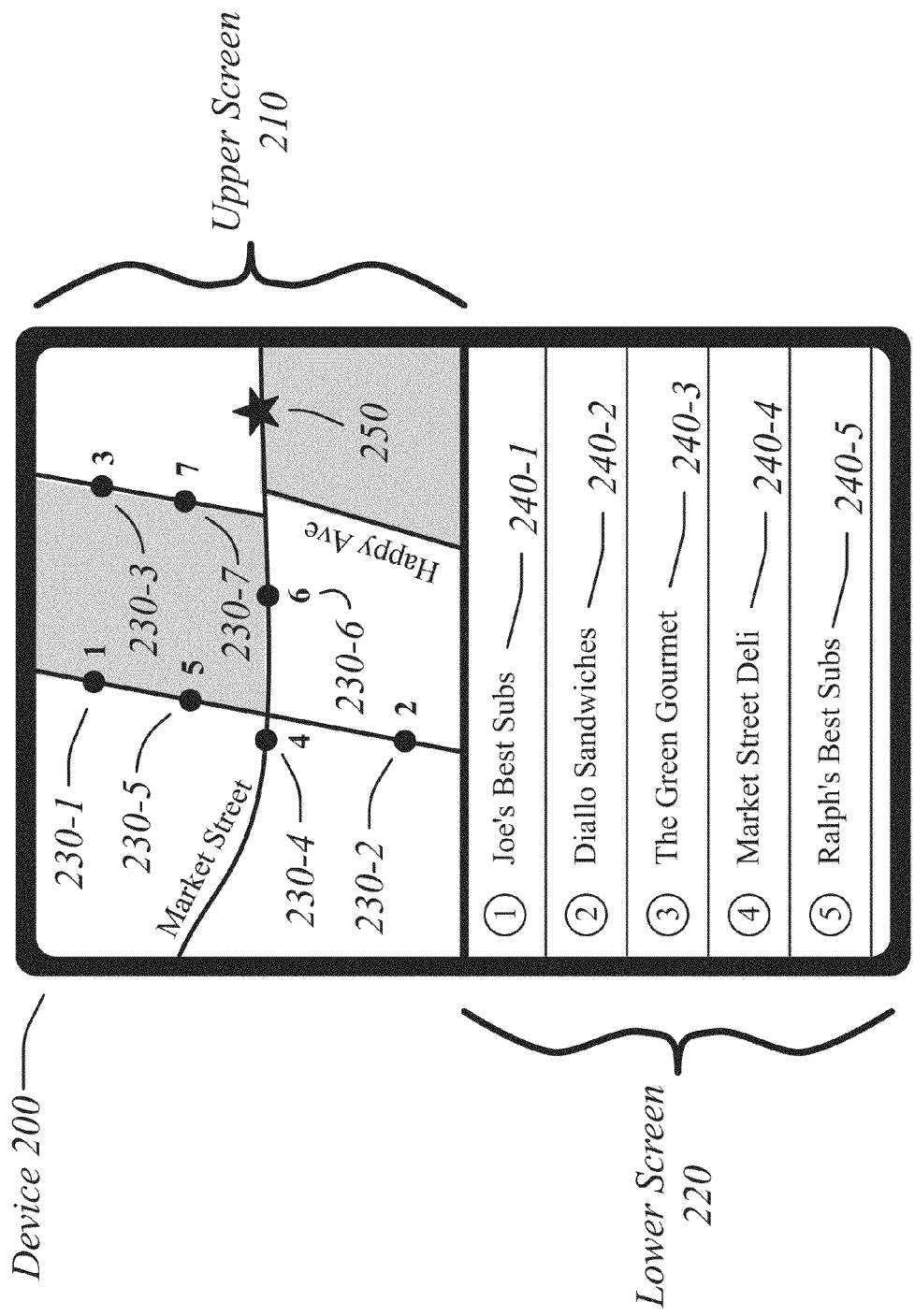
FIG. 2 illustrates an embodiment of a display of a device for a location-based search application.

FIG. 2 illustrates an embodiment of a display on a device 200 for the display system 100. As shown in FIG. 2, the device 200 is display a map on an upper screen 210 and a list on the lower screen 220.

The upper screen 210 may correspond to the first screen area displaying the location-based information 130 on a map according to geographic location. The marked locations 230-a may comprise the location-based information 130. The map displayed in the upper screen 210 may also comprise a user location 250 indicating the current location of the user on the map. In some embodiments, an initial display of a map in the first screen area may initially be centered on the current location of the user. In other embodiments, the initial center of the map, and the geographic area covered by the map, may be selected so as to include the user's current location and as many geographic locations of the location-based information 130 as possible while still maintaining legibility of the displayed information.

The lower screen 220 may correspond to the second screen area displaying the location-based information 130 as a list. The listed locations 240-*b* may comprise the location-based information 130.

It will be appreciated that each of the displays may comprise only a portion of location-based information 130 received as a result of a location-based search. For instance, the location-based information 130 may include a name for each location, but those names may only be displayed on the list in the second screen area and not on the map in the first screen area. The location-based information 130 may include a precise geographic place for each location but, but that precise geographic place may only be displayed on the map in the first screen area and not in the list in the second screen area; a precise geographic place may comprise a latitude and longitude, street address, or any other technique for indicating a specific geographic place. Similarly, the location-based information 130 may include more locations than are displayed at any one time on either the map or the list due to limited screen real estate and the desire to have the displayed information be sufficiently large to be legible.

As shown in FIG. 2, the first screen area and second screen area may include icons, numbers, letters, or any other visual element to indicate the association between the contents of the map and the list. For example, listed location 240-1 for "Joe's Best Subs" has associated with it the number "1" on the left side of its entry on the list. Market location 230-1 near the upper portion of the upper screen 210 has associated with it the number "1" to the right of the dot indicating a geographic location. This illustrates the association that the dot marked with a "1" on the map is the same location from the location-based information 130 as the list entry marked with a "1" in the list: "Joe's Best Subs."

FIG. 2 may depict an initial layout for the first screen area and the second screen area. In general, the first screen area and the second screen area may be equal in size in an initial layout. The initial layout may comprise the first layout of the location-based information 130 displayed as a response to a user initiating a location-based search. The first screen area and the second screen area being equal in size may correspond to them having the same dimensions, such as the same height and width, or to them using the same amount of area.

It will be appreciated that while the first screen area is shown as an upper screen 210 and the second screen area is shown as a lower screen 220, that other relative positioning may be used in various embodiments. For example, the first screen area may be displayed beneath the second screen area, the screen areas may be displayed side-by-side-side, or any other arrangement may be used. The first and second screen areas may be adjacent, as depicted, or may include user interface elements between them. It will be appreciated that while the illustrated embodiment of FIG. 2 depicts only the display of the location-based information 130 that embodiments may include the display of additional information, such as via other user interface elements, which may not be directly related to the display of location-based information 130.

Figure 3:
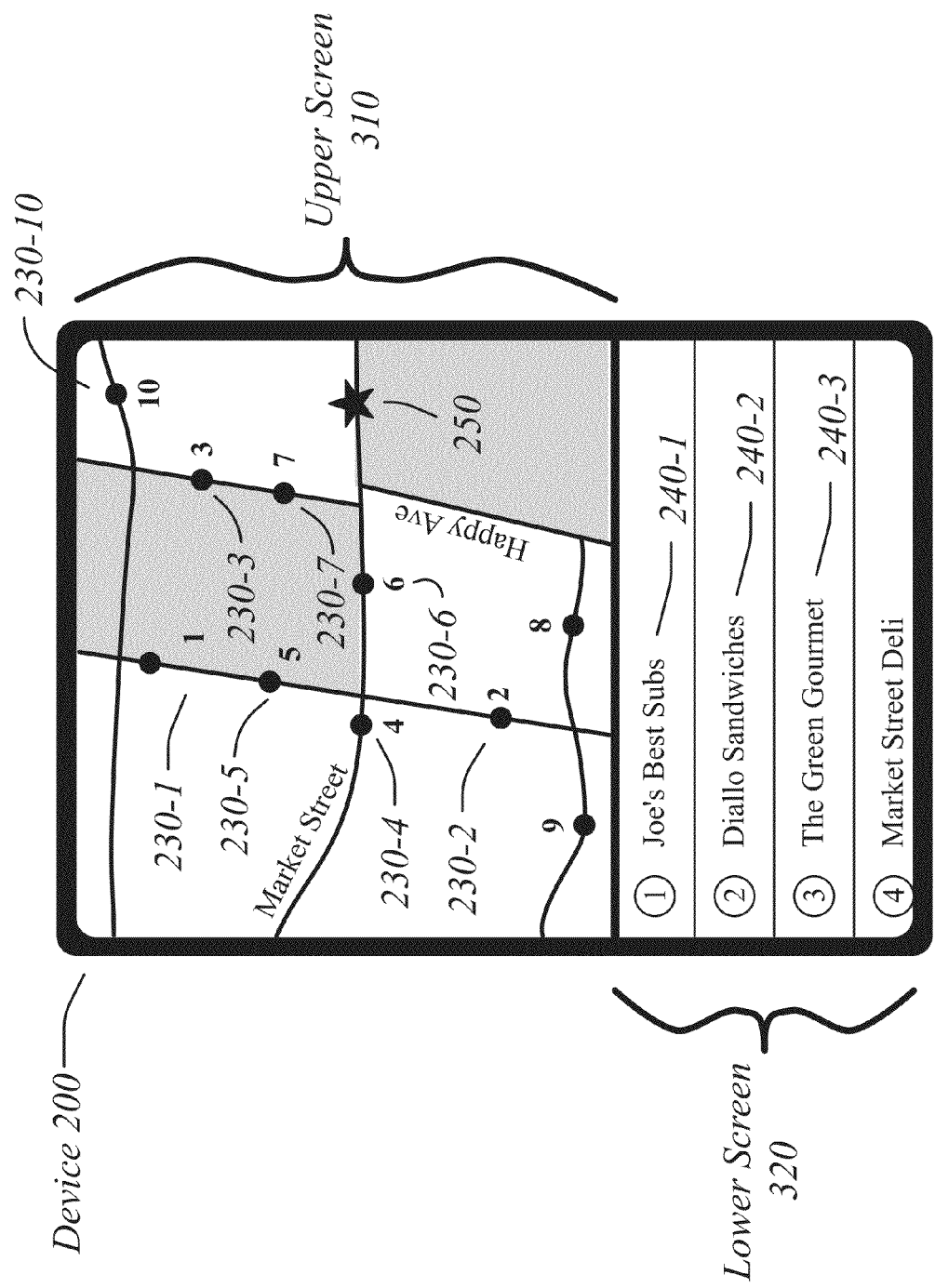
FIG. 3 illustrates a second embodiment of a display of a device in which the size of the upper screen has been increased.

FIG. 3 illustrates a second embodiment of a display on a device 200 for the display system 100. As shown in FIG. 3, the device 200 is displaying a map on an upper screen 310 and a list on the lower screen 320, with the upper screen 310 taking up a larger portion of the total display area of the device 200 than the lower screen 320.

The illustrated embodiment of FIG. 3 may be the result of a user interacting with the upper screen 210 of FIG. 2 and the screen-management component 140 automatically adjusting the relative sizes of the first screen area and second screen area in response to that user interaction. The screen-management component 140 may be operative to increase in size the first screen area in response to the received interaction 150 being with the first screen area and to decrease in size the second screen area in response to the received interaction 150 being with the first screen area.

For example, the display of FIG. 3 may be the result of a user interaction 150 being to select a particular one of the marked locations 230-*a*. The user may have selected a particular location, such as 230-6. In some embodiments, the selection of a particular location, such as 230-6, may result in the display of additional information regarding 230-6. This additional information may be displayed in an additional user interface area, as a pop-up window obscuring a portion of the map displayed in upper screen 310, or via any other technique for displaying information.

Figure 4:
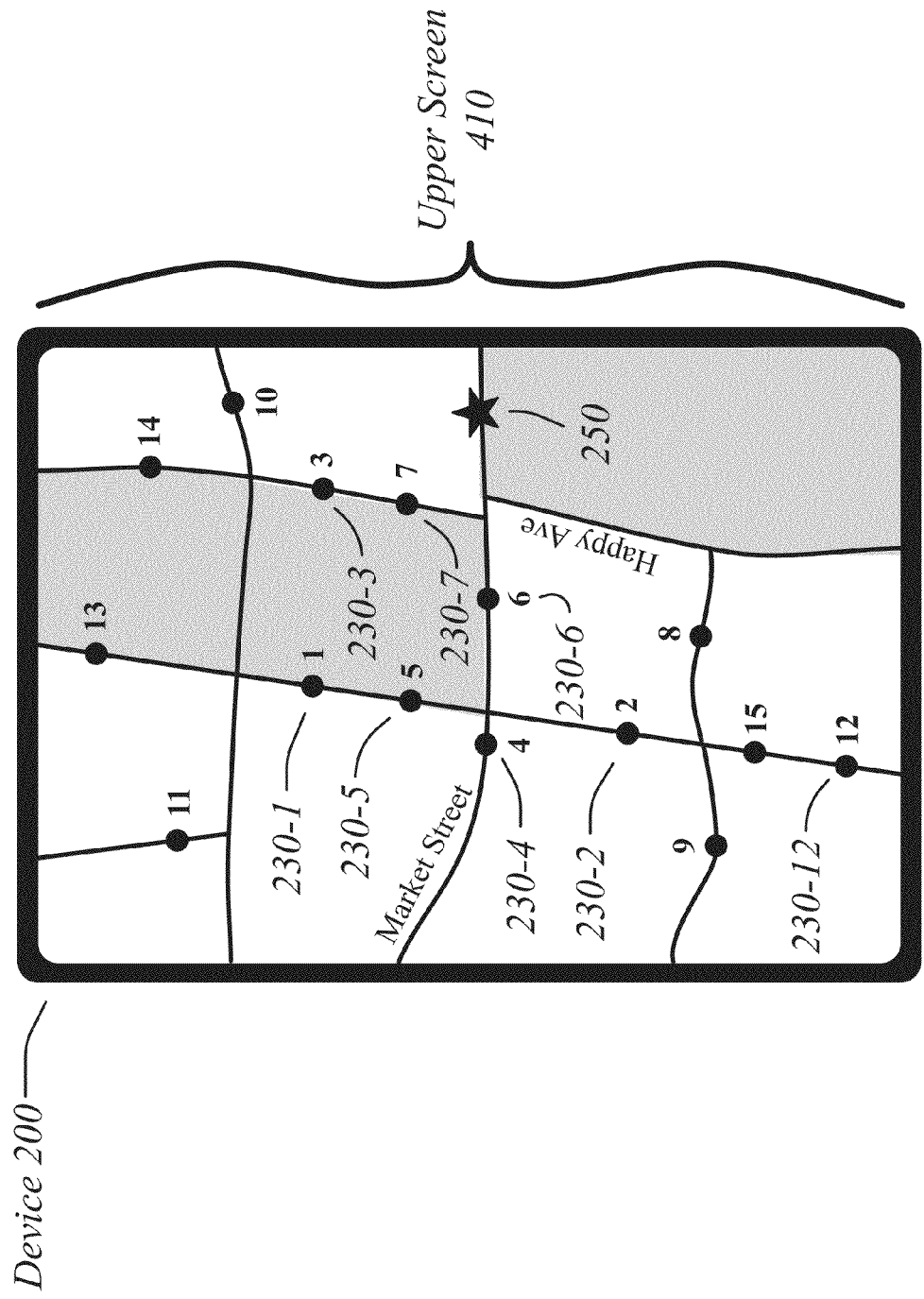
FIG. 4 illustrates a third embodiment of a display of a device in which the size of the upper screen has been increased to eclipse the lower screen.

FIG. 4 illustrates a third embodiment of a display on a device 200 for the display system 100. As shown in FIG. 4, the device 200 is displaying a map on an upper screen 410 with no visible lower screen.

In some cases, the second screen area may be decreased in size to no longer be visible in response to the received interaction with the first screen area, and the first screen area may be increased in sized to fill a combined area of the first screen area and second screen area. This may allow for the first screen area to have the maximal possible amount of screen area available for the display of the map of the first screen area. In some embodiments, the first screen area may be increased to such a size, the second screen area reduced to no longer be visible, in response to any interaction with the first screen area. The increase in size of the first screen area to encompass the combined area of the first and second screen areas may be reached iteratively as the result of multiple user interactions or may be the result of a single user interaction 150.

The transition between sizes for the first and second screen areas may be visually displayed according to any of the known techniques. For example, the transition may be immediate, with the display for device 200 moving directly from the first relative sizes to the second relative sizes without the depiction of any intermediate sizes. Alternatively, the transition may be animated, with the first screen area increasing in size gradually and the second screen area decreasing in size gradually, so as to show the transition to the user for easier user comprehension. In some embodiments, a center point may be maintained in the center of the first screen area during the resizing of the first screen area. Where the transition is animated, this center point may be maintained during the entire animation. Alternatively, such as where the user interaction with the first screen area is a command to scroll the displayed map, the visual scroll of the displayed map may be displayed simultaneously with the resizing of the first and second screen areas.

Figure 5:
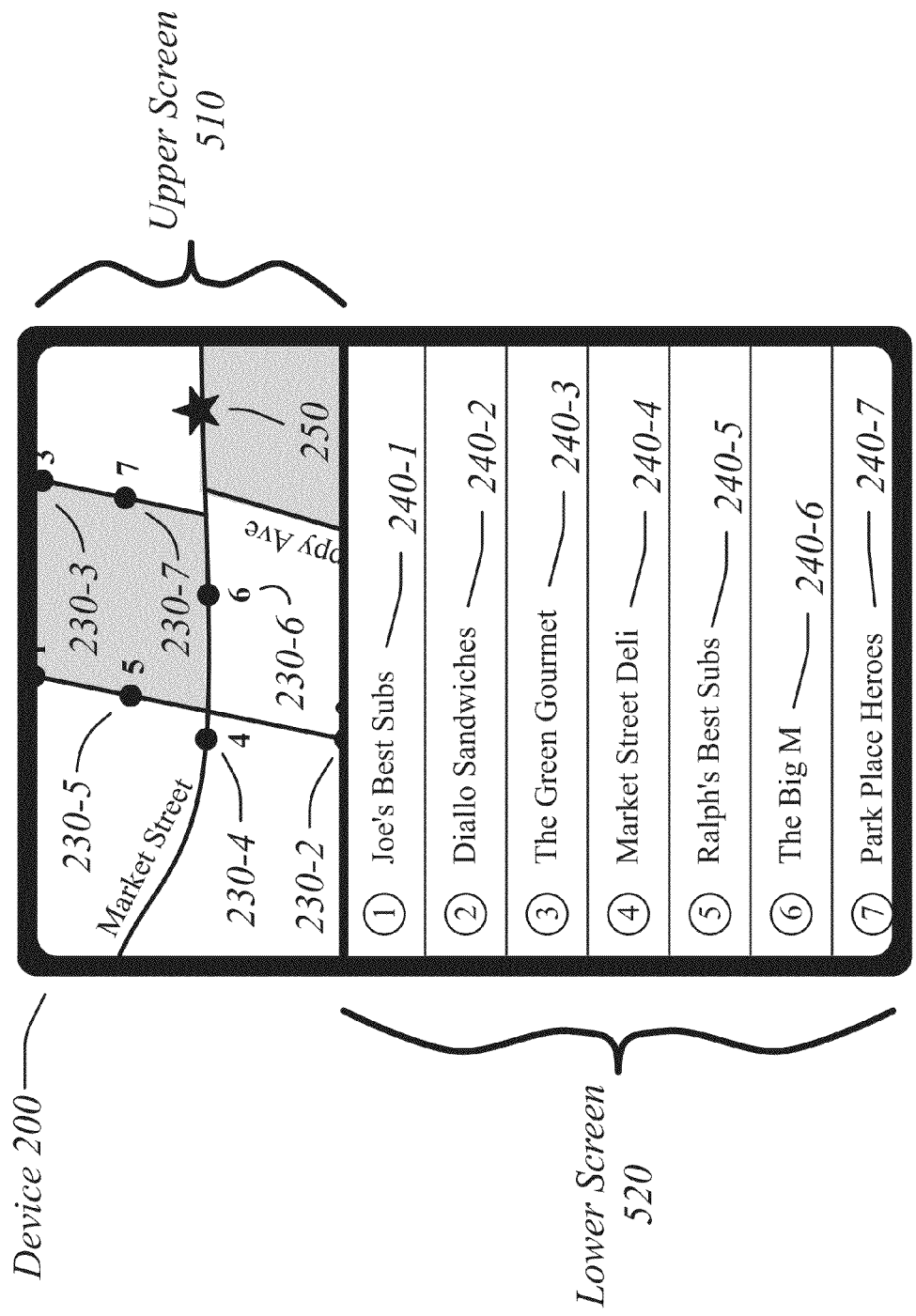
FIG. 5 illustrates a four embodiment of a display of a device in which the size of the lower screen has been increased.

FIG. 5 illustrates a fourth embodiment of a display on a device 200 for the display system 100. As shown in FIG. 5, the device 200 is displaying a map on an upper screen 510 and a list on the lower screen 520, with the upper screen 510 taking up a smaller portion of the total display area of the device 200 than the lower screen 520.

The illustrated embodiment of FIG. 5 may be the result of a user interacting with the lower screen 220 of FIG. 2 and the screen-management component 140 automatically adjusting the relative sizes of the first screen area and second screen area in response to that user interaction. The screen-management component 140 may be operative to increase in size the second screen area in response to the received interaction 150 being with the second screen area and to decrease in size the first screen area in response to the received interaction 150 being with the second screen area.

For example, the display of FIG. 5 may be the result of a user interaction 150 being to select a particular one of the listed locations 240-*b*. The user may have selected a particular location, such as 240-2. In some embodiments, the selection of a particular location, such as 240-2, may result in the display of additional information regarding that location. This additional information may be displayed in an additional user interface area, as a pop-up window obscuring a portion of the map displayed in lower screen 520, or via any other technique for displaying information.

As illustrated in FIG. 5, the increase in size of the second screen area may allow for the display of more listed locations 240-*b* and therefore the display of a larger portion of the location-based information 130. Where FIG. 2 only displayed five of the plurality of listed locations 240-*b*, FIG. 5 has increased the size of the second screen area sufficiently to display an additional two.

As such, the display of FIG. 5 may be the result of a user interaction 150 comprising a request to scroll the displayed list of the second screen area. For instance, the user may have made an upwards swiping motion along the second screen area to request the display of additional elements of the list. The increasing in size of the second screen area and the decreasing in size of the first screen area may comprise the second screen area expanding to eclipse a portion of the first screen area to make visible a larger portion of the location-based information 130 in response to the received interaction 150 comprising a request to scroll the displayed list. If the interaction 150 is interpreted, such as based on the vertical length of a swipe, to be a request to display a particular number of additional entries in the list, the second screen area may be increased in size by the combined size of the two additional entries and the first screen area decreased in size by an equal amount.

Figure 6:
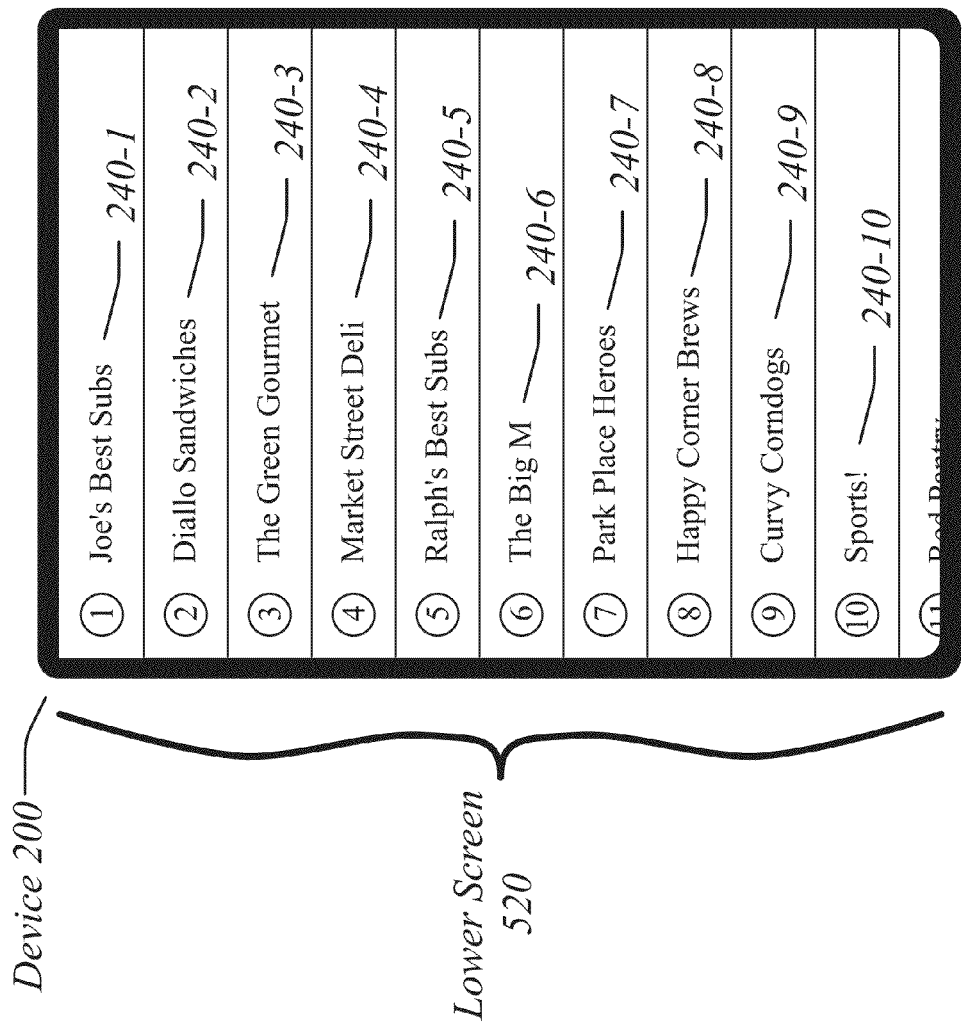
FIG. 6 illustrates a fifth embodiment of a display of a device in which the size of the lower screen has been increased to eclipse the upper screen.

FIG. 6 illustrates a fifth embodiment of a display on a device 200 for the display system 100. As shown in FIG. 6, the device 200 is displaying a list on a lower screen 620 with no visible upper screen.

In some cases, the first screen area may be decreased in size to no longer be visible in response to the received interaction with the second screen area, and the second screen area may be increased in sized to fill a combined area of the first screen area and second screen area. This may allow for the second screen area to have the maximal possible amount of screen area available for the display of the list of the second screen area. In some embodiments, the second screen area may be increased to such a size, the first screen area reduced to no longer be visible, in response to any interaction with the second screen area. The increase in size of the second screen area to encompass the combined area of the first and second screen areas may be reached iteratively as the result of multiple user interactions or may be the result of a single user interaction 150.

The display of FIG. 6 may be the result of a user interaction 150 comprising a request to scroll the displayed list of the second screen area, wherein the request is for a sufficient number of additional list items to be displayed such that adding the area use to display them to the existing area of the second screen area uses an amount of space at least equal to the combined area of the first and second screen areas. In some instances, the initially-displayed entries of the list may be scrolled up and off the screen in order to accommodate the display of additional entries.

Figure 7:
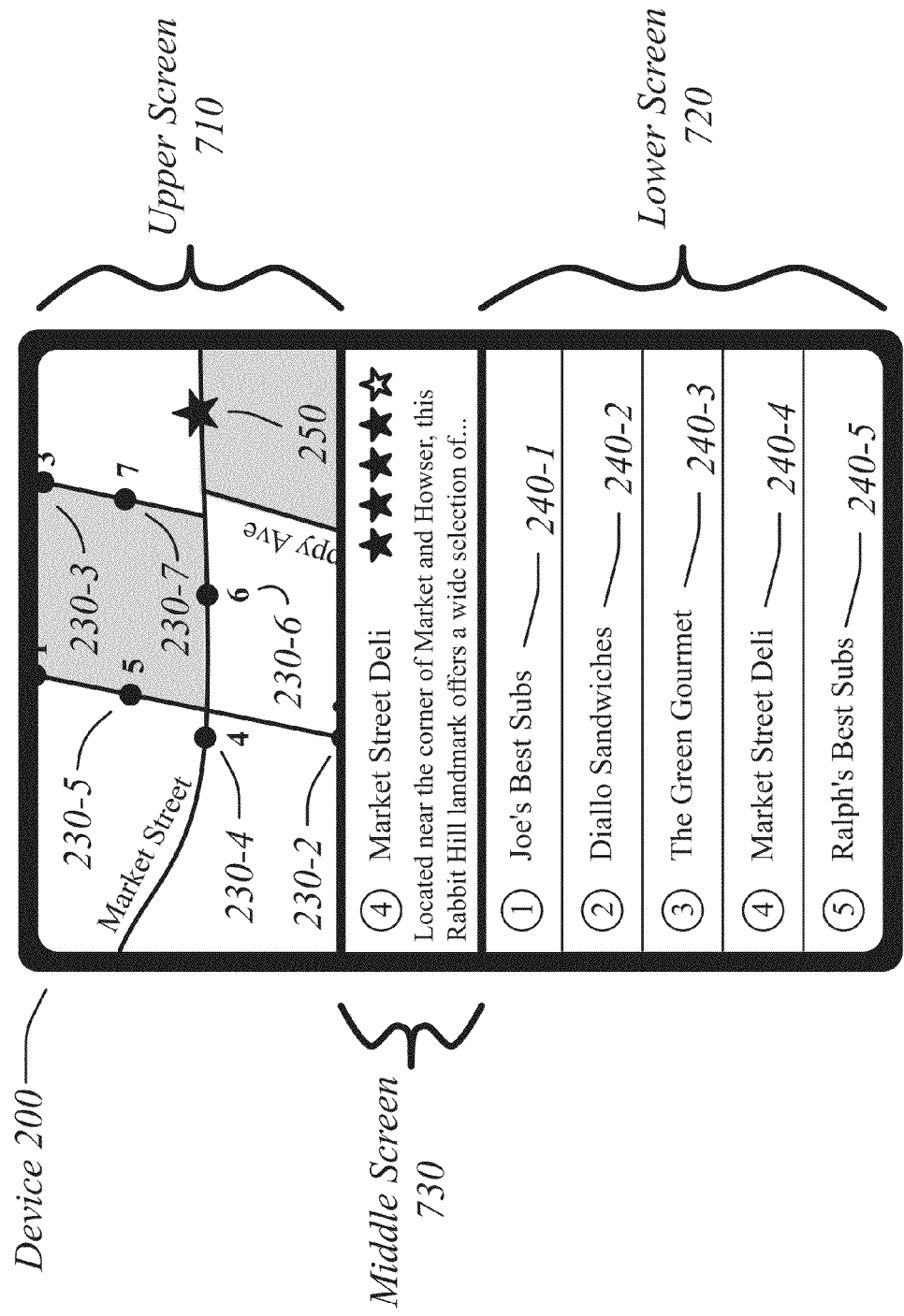
FIG. 7 illustrates a sixth embodiment of a display of a device in which a middle screen is included.

FIG. 7 illustrates a sixth embodiment of a display on a device 200 for the display system 100. As shown in FIG. 7, the device 200 is displaying a middle screen 730.

The middle screen 730 may comprise an information area for the display of additional information about a selected entry in the location-based information 130. In the illustrated embodiment of FIG. 7 the middle screen 730 is displaying additional information about the fourth entry in the list, "Market Street Deli," listed location 240-4 in the second screen area and marked location 230-4 in the first screen area. The additional information includes an average user rating—four out of five stars—and a snippet of a description of the location. It will be appreciated that while the additional information is illustrated as being displayed in a middle area, that this information could be displayed in any screen area with any relative positioning to the first screen area and second screen area.

In some embodiments, the area dedicated to the information area may remain constant as the area dedicated to the first screen area and second screen area are adjusted relative to each other. In some embodiments, the information area may be created upon the selection of an entry in either of the first screen area or second screen area, with the area for the display of the information area taken from both the first and second screen areas, such as in equal amount or equal proportion.

Alternatively, the information area may be created out of space taken from the screen area being reduced in size in response to a user interaction 150. For example, if the user interacts with the first screen area, the second screen area may be reduced in size, with the space left available divided between the creation of the information area and the increase in size of the first screen area. Contrarily, if the user interacts with the second screen area, the first screen area may be reduced in size, with the space left available divided between the creation of the information area and the increase in size of the second screen area.

Where the information area uses space that was previously dedicated to one of the first and second screen areas the possible expansion of the first and screen areas in response to user interactions may be limited. For example, the first screen area may be increased in size sufficiently to remove the second screen area from display. However, the first screen area may not have been increased to encompass the combined area of the first and second screen areas. Instead, the first screen area may have been increased to encompass the combined area of the first and second screen areas minus that portion used for the display of the information area. Similarly, the second screen area may be increased in size sufficiently to remove the first screen area from display. However, the second screen area may not have been increased to encompass the combined area of the first and second screen areas. Instead, the second screen area may have been increased to encompass the combined area of the first and second screen areas minus that portion used for the display of the information area.

Figure 8:
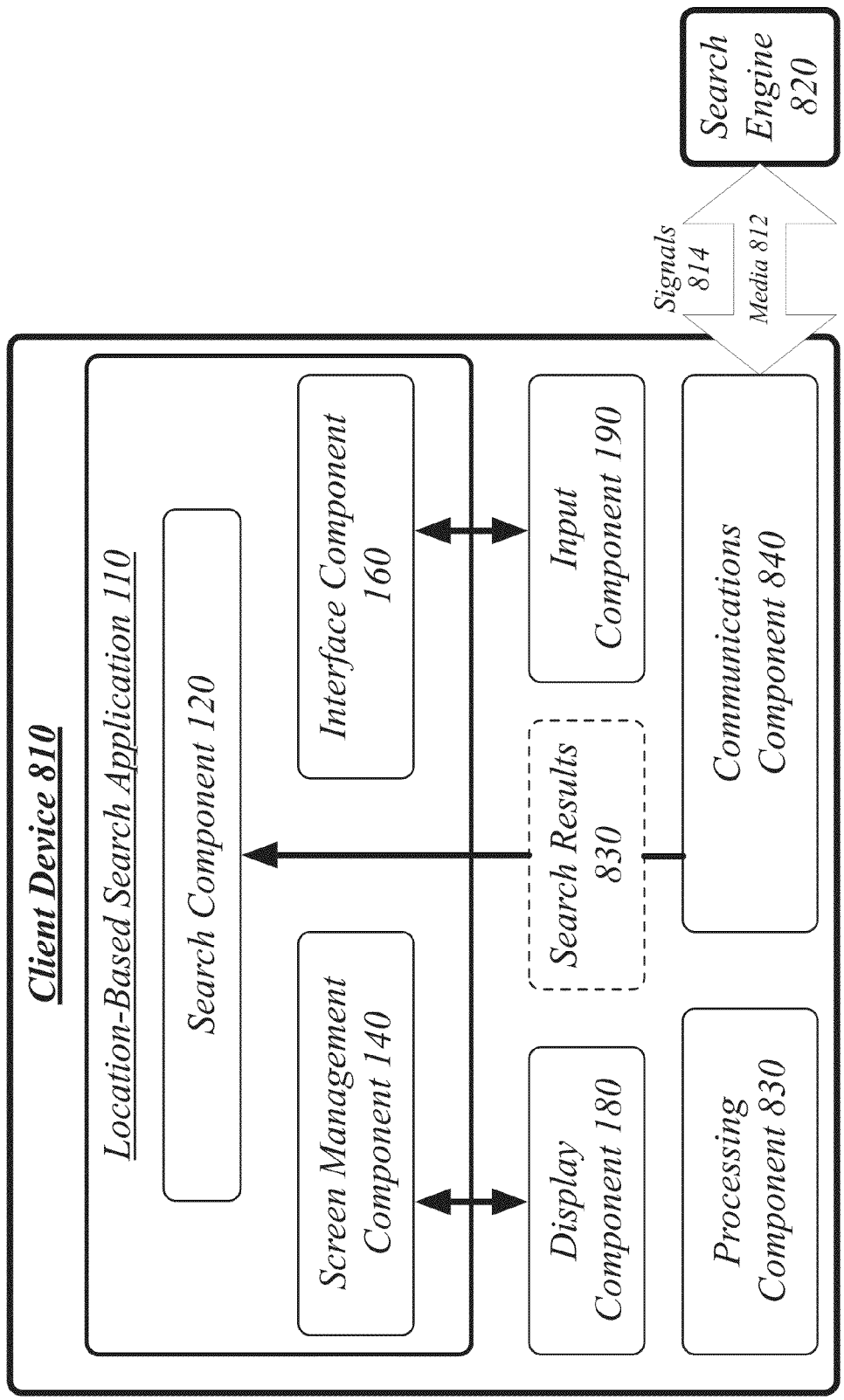
FIG. 8 illustrates an embodiment of a centralized system for the display system of FIG. 1.

FIG. 8 illustrates a block diagram of a centralized system 800. The centralized system 800 may implement some or all of the structure and/or operations for the display system 100 in a single computing entity, such as entirely within a single client device 810.

The client device 810 may comprise any electronic device capable of receiving, processing, and sending information for the display system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The client device 810 may execute processing operations or logic for the display system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The client device 810 may execute communications operations or logic for the display system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The client device 810 may communicate with a search engine 820 over a communications media 812 using communications signals 814 via the communications component 840. The search engine 820 may comprise a location-based search engine or may otherwise support location-based searches. The search engine 820 may comprise a component of a social-networking service, a service provided by the social-networking service, or may otherwise draw information on or be associated with a social-networking service. The search component 120 may submit a search, such as a location-based search, to the search engine 820 and receive in response search results 830. The search results 830 may comprise the location-based information 130.

Figure 9:
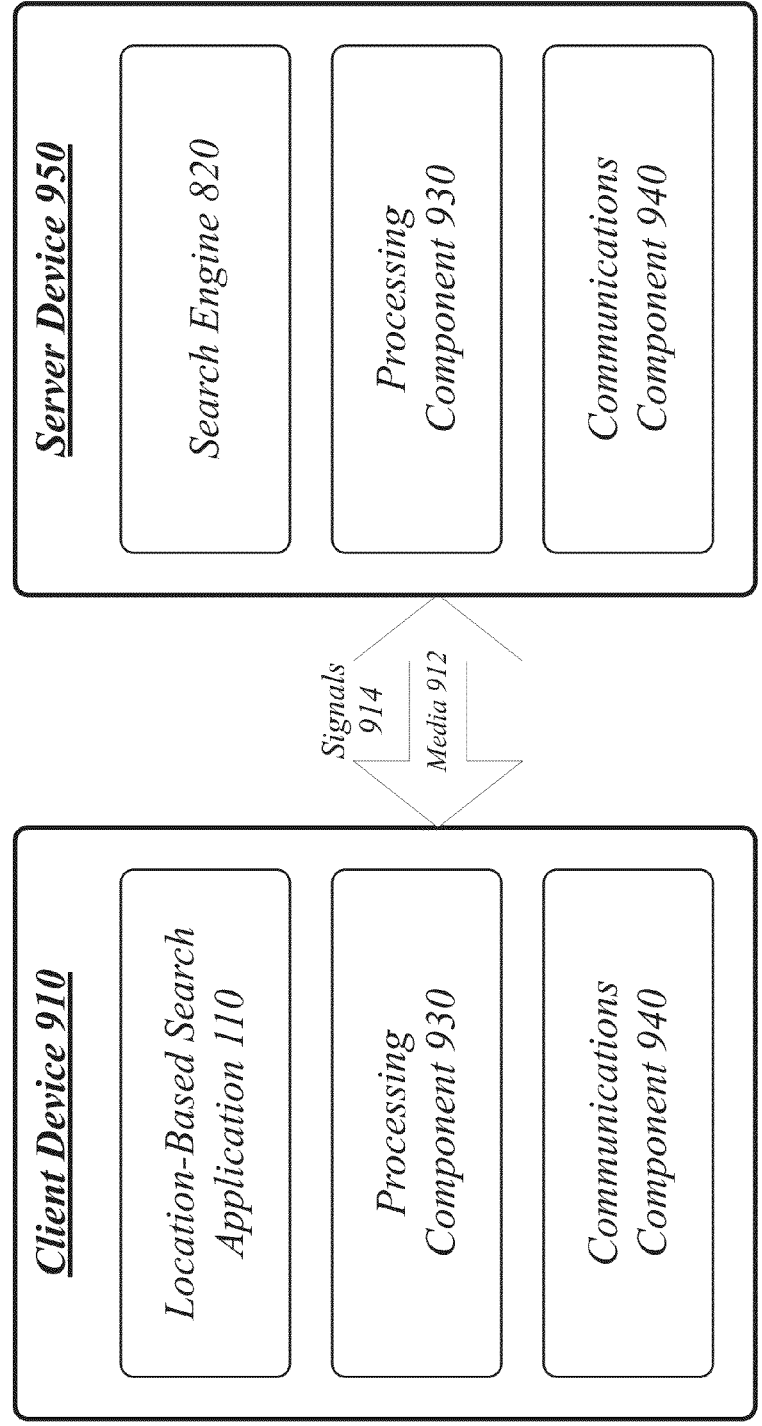
FIG. 9 illustrates an embodiment of a distributed system for the display system of FIG. 1.

FIG. 9 illustrates a block diagram of a distributed system 900. The distributed system 900 may distribute portions of the structure and/or operations for the display system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 and the server device 950 may be the same or similar to the client device 810 as described with reference to FIG. 8. For instance, the client device 910 and the server device 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The client device 910 may comprise or employ one or more client programs that operate to perform various methodologies in accordance with the described embodiments. In one embodiment, for example, the client device 910 may implement the location-based search application 110. The location-based search application 110 may comprise a social-networking application used in associated with a social-networking service, such as may be installed on a mobile device. The location-based search application 110 may comprise a web-based application, such as an application running inside of a web browser.

The server device 950 may comprise or employ one or more server programs that operate to perform various methodologies in accordance with the described embodiments. In one embodiment, for example, the server device 950 may implement the search engine 820.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may display in a first screen area location-based information 130 on a map according to geographic location at block 1002. The first screen area may comprise some portion of the display of a device, such as a mobile device. The first screen area may comprise any bounded area, such as a rectangle with a particular height and width.

The location-based information 130 may comprise a plurality of entries. Each of the entries may comprise one search result with a plurality of information regarding that search result. An entry may comprise a name of the search result, a geographic location, and one or more pieces of additional information such as user reviews, hours of operation, a location type, a representative image or icon, a list of friends who are fans of an entity associated with the search result, or any other information relevant to a search result.

The search results may be displayed on the map such that each search result whose associated geographic location is contained with the geographic area displayed by the map is displayed on the map at its respective geographic location. Each displayed search result may be displayed according to an icon, a representative image or icon included with the search result, an icon corresponding to the search result's type, or any other visual indicator. In some embodiments, multiple search results may be presented with a single icon representing a cluster of search results, wherein the distinct search results within that cluster are revealed if that cluster is selected.

The logic flow 1000 may display in a second screen area a list comprising the location-based information at block 1004. The second screen area may comprise some portion of the display of a device, such as a mobile device. The second screen area may comprise a portion of the same display of the same device as the first screen area. The second screen area may comprise any bounded area, such as a rectangle with a particular height and width.

The list may comprise a sequence of entries corresponding to the entries displayed on the map in the first search area. The list may comprise exactly those entries currently visible on the map in the first search area. The list may be sorted according to relevance. Relevance may be determined according to a how well a search result matches a search request, according to that result's distance from a user's current location, according to a popularity of the search result, according to a popularity of the search result on a social-networking service, according to a popularity of the search result with a user's friends on a social-networking service, according to any other known information about the search result, and according to any combination of information. The number of entries visible in the map in the first search area may exceed the number that can be displayed in the space available in the second search area. Where this is the case, a subset of the search results may be displayed in the second search area. In an initial layout, the most-relevant search results may be displayed. However, as the results are scrolled results other than the most-relevant may be scrolled into view and replace the most-relevant results.

Where the list comprises exactly those entries currently visible on the map in the first search area the list may be updated as the geographic area visible in the map of the first search area is changed. For instance, a user may scroll the map, change the zoom level of the map, or otherwise change the geographic area visible in the map. As the visible area is changed, the portion of the search results contained within that area may also change. The list may therefore be updated according to these changes, such that as the currently visible area of the map is changed the entries displayed in the list change.

As such, according to a first visible area of the map a first subset of the search results may be visible and the list may contain the first subset of the search results. A user may initiate a change to the visible area of the map to produce a second visible area of the map in which a second subset of the search results are visible. The list may therefore be updated to contain only the second subset of the search results. The second subset of search results may contain one or more search results not present in the first subset of search results, the second subset of search results therefore containing one or more additional search results. The second subset of search results may contain one or more search results that were present in the first subset of search results.

The logic flow 1000 may receive an interaction 150 with one of the first screen area and second screen area at block 1006. The interaction 150 may comprise a user selecting or otherwise interacting with one of the search results as displayed in either of the first or second screen area.

The logic flow 1000 may adjust a relative size of the first screen area and the second screen area in response to the received interaction 150 at block 1008. This may comprise increasing the size of the screen area interacted with and decreasing the size of the other screen area. The search results displayed in the first screen area and second screen area may also be adjusted in response to the interaction 150, such as where the interaction 150 allows for the display of additional entries in the list of the second area, where the interaction 150 changes which search results are displayed on the map of the first screen area, or where the search results displayed in the second screen area are changed in response to the change of which search results are visible in the map of the first screen area.

The embodiments are not limited to this example.

Figure 11:
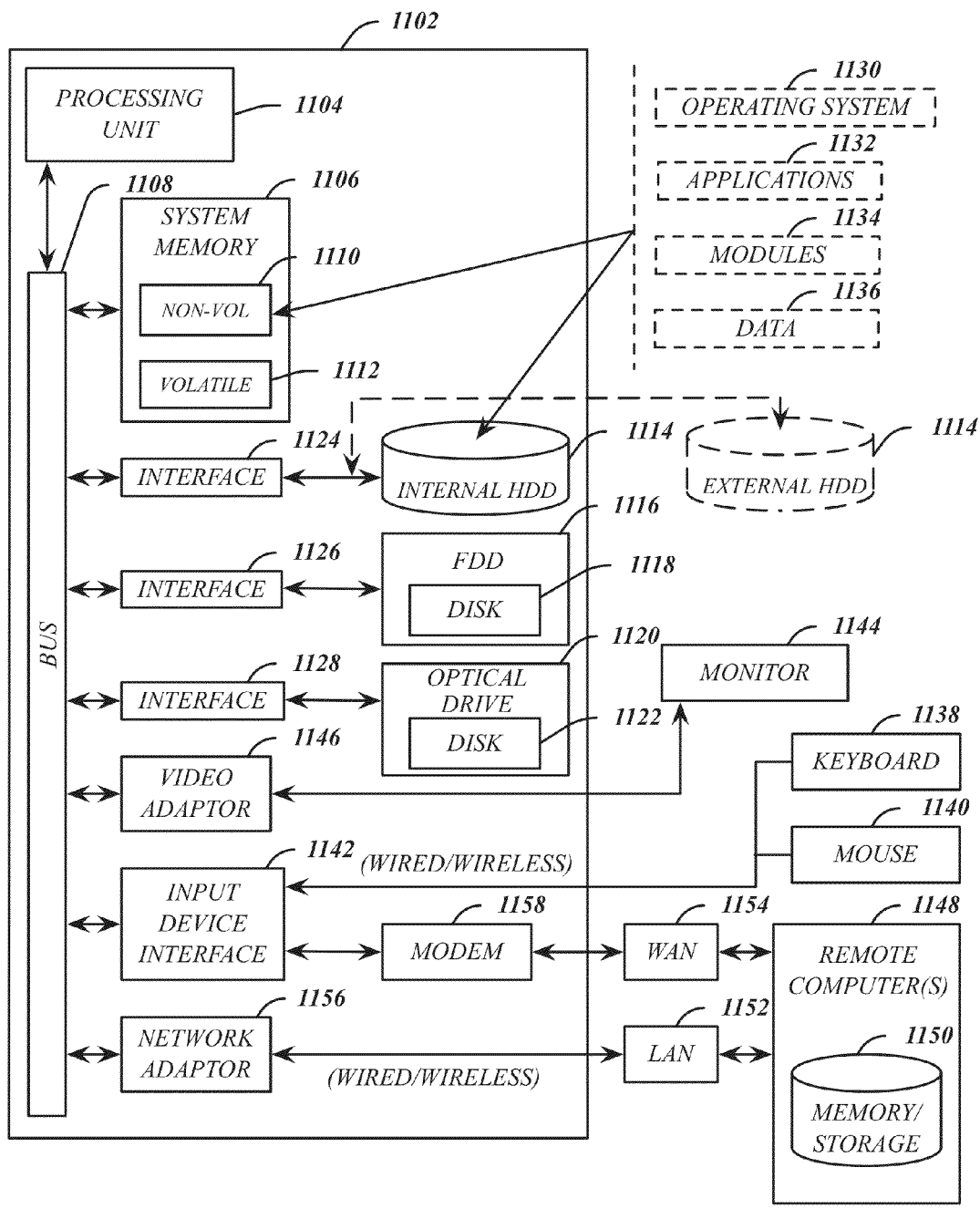
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the display system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
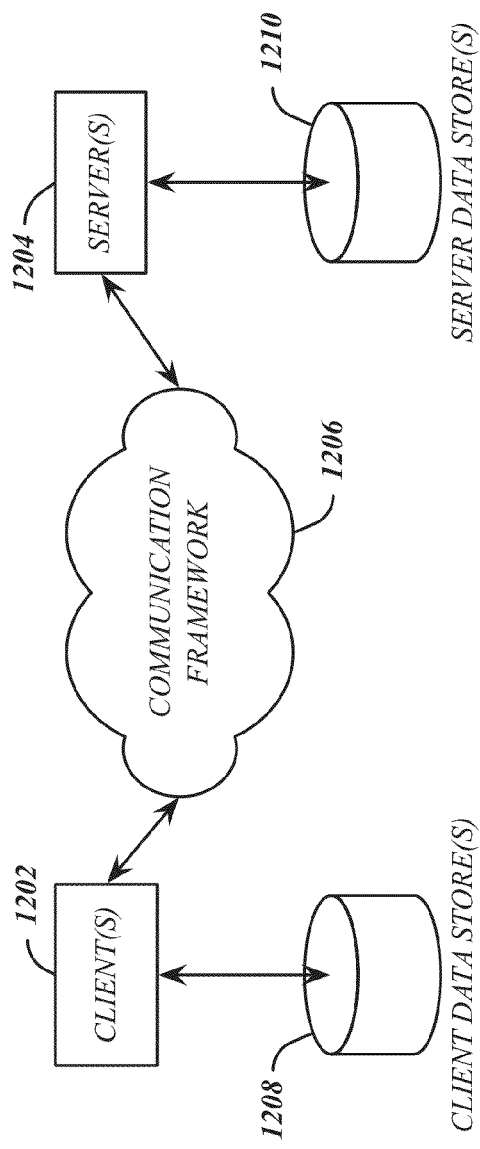
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   displaying in a first screen area location-based information on a map according to geographic location;
   displaying in a second screen area a list comprising the location-based information;
   receiving an interaction with one of the first screen area and second screen area; and
   adjusting a relative size of the first screen area and the second screen area in response to the received interaction, wherein adjusting the relative size of the first screen area and the second screen area comprises: maintaining a center point of the map in a center of the first screen area during a resizing of the first screen area, and expanding or contracting an amount of map area that is displayed in the first screen area.

2. The method of claim 1, the location-based information comprising search results for a location-based search.

3. The method of claim 1, the first screen area and the second screen area equal in size in an initial layout.

4. The method of claim 1, comprising:
   increasing in size the first screen area in response to the received interaction being with the first screen area; and
   decreasing in size the second screen area in response to the received interaction being with the first screen area.

5. The method of claim 4, the second screen area decreased in size to no longer be visible in response to the received interaction with the first screen area, the first screen area increased in size to fill a combined area of the first screen area and second screen area.

6. The method of claim 1, comprising:
   increasing in size the second screen area in response to the received interaction being with the second screen area; and
   decreasing in size the first screen area in response to the received interaction being with the second screen area.

7. The method of claim 6, the increasing in size of the second screen area and the decreasing in size of the first screen area comprising the second screen area expanding to eclipse the first screen area to make visible a larger portion of the location-based information in response to the received interaction comprising a request to scroll the displayed list.

8. The method of claim 7, the increasing in size of the second screen area stopping once the second screen area has expanded to fill a combined area of the first screen area and second screen area, the first screen area no longer visible.

9. An apparatus, comprising:
   a processor circuit on a device;
   a screen management component operative on the processor circuit to display in a first screen area location-based information on a map according to geographic location, to display in a second screen area a list comprising the location-based information, and to adjust a relative size of the first screen area and the second screen area in response to a received interaction with one of the first screen area and second screen area, wherein adjusting the relative size of the first screen area and the second screen area comprises:
   maintaining a center point of the map in a center of the first screen area during a resizing of the first screen area, and expanding or contracting an amount of map area that is displayed in the first screen area; and
   an interface component operative on the processor circuit to receive the interaction with one of the first screen area and second screen area.

10. The apparatus of claim 9, the screen management component operative to increase in size the first screen area and to decrease in size the second screen area in response to the received interaction being with the first screen area.

11. The apparatus of claim 10, the second screen area decreased in size to no longer be visible in response to the received interaction with the first screen area, the first screen area increased in size to fill a combined area of the first screen area and second screen area.

12. The apparatus of claim 9, the screen management component operative to increase in size the second screen area and decrease in size the first screen area in response to the received interaction being with the second screen area.

13. The apparatus of claim 12, the increasing in size of the second screen area and the decreasing in size of the first screen area comprising the second screen area expanding to eclipse the first screen area to make visible a larger portion of the location-based information in response to the received interaction comprising a request to scroll the displayed list.

14. At least one non-transitory computer-readable storage medium comprising instructions that, when executed, cause a system to:
- display in a first screen area location-based information on a map according to geographic location, the local-based information comprising search results for a location-based search;
- display in a second screen area a list comprising the location-based information;
- receive an interaction with one of the first screen area and second screen area; and
- adjust a relative size of the first screen area and the second screen area in response to the received interaction, wherein adjusting the relative size of the first screen area and the second screen area comprises: maintaining a center point of the map in a center of the first screen area during a resizing of the first screen area, and expanding or contracting an amount of map area that is displayed in the first screen area.

15. The computer-readable storage medium of claim 14 comprising further instructions that, when executed, cause a system to:
- increase in size the first screen area in response to the received interaction being with the first screen area; and
- decrease in size the second screen area in response to the received interaction being with the first screen area.

16. The computer-readable storage medium of claim 14 comprising further instructions that, when executed, cause a system to:
- increase in size the second screen area in response to the received interaction being with the second screen area; and
- decrease in size the first screen area in response to the received interaction being with the second screen area.

17. The computer-readable storage medium of claim 14, the increase in size of the second screen area and the decrease in size of the first screen area comprising the second screen area expanding to eclipse the first screen area to make visible a larger portion of the location-based information in response to the received interaction comprising a request to scroll the displayed list.

* * * * *